J. P. Gordon.
Bit Stock.
N° 52,042.  Patented Jan. 16, 1866.
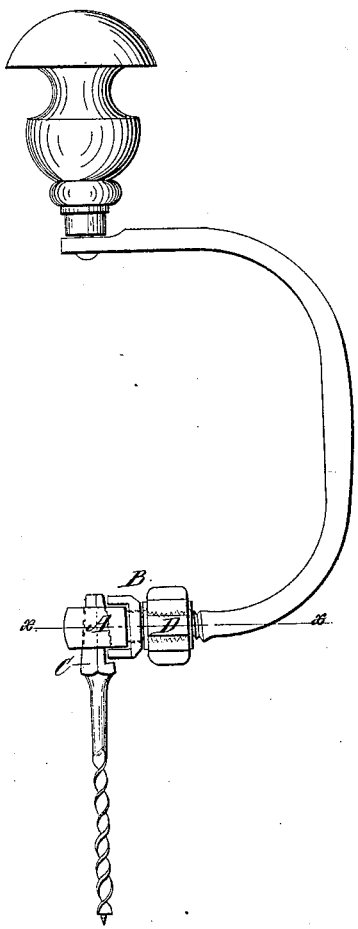
Fig: 1.
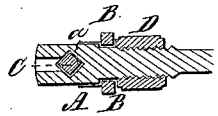
Fig: 2.
Witnesses:
Inventor:

UNITED STATES PATENT OFFICE.

J. PARKER GORDON, OF WEST GARLAND, MAINE.

IMPROVEMENT IN BIT-HOLDERS FOR BRACES.

Specification forming part of Letters Patent No. 52,042, dated January 16, 1866.

*To all whom it may concern:*

Be it known that I, J. PARKER GORDON, of West Garland, in the county of Penobscot and State of Maine, have invented a new and useful Mode of Securing Bits in Braces; and I do hereby declare that the following is a full, clear, and exact description thereof, which will enable others skilled in the art to make and use the same, reference being had to the accompanying drawings, forming part of this specification, in which—

Figure 1 is a side view of my invention. Fig. 2 is a transverse section taken in the plane of the line $x\ x$, Fig. 1.

Similar letters of reference indicate like parts.

My invention consists in the employment of a clutch of novel construction fitted to slide on the arm of the brace and so arranged that one of its wings will press into a suitable notch or recess made in the edge of the bit for the purpose of holding it firmly in place, and in using, in connection with such clutch, a thumb-nut working on a thread cut on the arm of the brace, whereby all the parts may be held rigidly together and operated easily, as will be hereinafter explained.

To enable others to understand my invention, I will proceed to describe it.

A is the socket, having a suitable hole through it for receiving the bit therein. This hole is made crosswise in the socket—that is to say, so that two corners instead of two plain sides are in a line parallel to the socket and arm of the bit-stock, and thus, when the tool is inserted one of its corners is toward the arm of the brace.

B is a clutch which is fitted to slide on the arm or shank of the brace. This clutch carries two wings, which project over the socket so as to come in contact with the bit C; and the bit C has a recess or notch cut in one of its edges, into which one wing of this clutch sinks when the same is pressed up closely against the bit, and thus, when the one wing presses against the small end of the bit the other end rests in the notch cut therein (on the other side of the socket) to receive it, and thus the bit is held in a perfectly vertical position.

B is a nut or thumb-screw, which is fitted to work on a screw-thread, $a$, on the arm or shank of the brace near the socket A. It will be seen by reference to both figures that on screwing up this thumb-screw close to the clutch the wings of the latter will be caused to operate upon the bit, as above described, and that upon moving it or turning it in an opposite way the clutch can be readily drawn out of the recess in the bit, and thus the latter will be free to be withdrawn. This mode of holding bits in braces is very simple and perfectly reliable in every respect, and possesses many advantages over those now in use which it is not necessary here to mention.

I do not limit myself to the precise construction of the parts above described, as many changes could be made without affecting the practical results obtained by the arrangement herein described.

What I claim as new, and desire to secure by Letters Patent, is—

A bit-holder for a brace, consisting of the sliding winged clutch B, nut D, working on the horizontal screw-thread $a$, when arranged to hold the bit in socket A, substantially in the manner described.

J. PARKER GORDON.

Witnesses:
  A. G. GORDON,
  EBEN BLANCHARD.